United States Patent
Hallenbeck

[11] 3,938,573
[45] Feb. 17, 1976

[54] RUN FLAT TIRE AND WHEEL ASSEMBLY
[75] Inventor: Victor L. Hallenbeck, Brecksville, Ohio
[73] Assignee: The B. F. Goodrich Company, Akron, Ohio
[22] Filed: Apr. 11, 1974
[21] Appl. No.: 459,872

[52] U.S. Cl............................ 152/330 RF; 152/347
[51] Int. Cl.².................... B60C 17/00; B60C 21/08
[58] Field of Search.. 29/159.1; 152/330 R, 330 RF, 152/330 L, 346, 347, 379, 378, 361 DM; 161/184, 187; 156/115; 220/63 A

[56] References Cited
UNITED STATES PATENTS

| | | |
|---|---|---|
| 2,040,645 | 5/1936 | Dickinson..................... 152/330 RF |
| 3,628,585 | 12/1971 | Pace................................... 152/347 |
| 3,719,219 | 3/1973 | Horvath et al.................. 152/379 R |
| 3,763,912 | 10/1973 | Bergomi et al.............. 152/361 DM |

Primary Examiner—Drayton E. Hoffman
Assistant Examiner—Larry H. Martin
Attorney, Agent, or Firm—Harry F. Pepper, Jr.; W. A. Shira, Jr.

[57] ABSTRACT

A combination comprising a wheel having a tire mounting rim and a pneumatic tire capable of being run in a deflated condition, the bead portions of the tire being cemented onto the bead seats of the rim with an epoxy adhesive so that the bead portions will remain on the bead seats when the tire is run without any inflation.

4 Claims, 3 Drawing Figures

U.S. Patent  Feb 17, 1976  3,938,573 ns in a deflated condition. The wheel can have any of the conventional rim configurations now in use with tubeless tires. The adhesive can be any known epoxy adhesive formulation preferably having some elasticity that will cure within a reasonable time after being applied. Preferably, the tire has a layer of cellular rubber inside the air impervious liner which is itself covered by a thin layer of a solid substance having a low coefficient of friction and which serves as a lubricant in the run-flat condition of the tire.

RUN FLAT TIRE AND WHEEL ASSEMBLY

CROSS REFERENCE TO RELATED APPLICATION

The invention of this application is related to that of the copending application for patent application Ser. No. 410,695, filed Oct. 29, 1973, by James W. Messerly and Joe A. Powell on a Tire With Run Flat Capability.

BACKGROUND OF THE INVENTION

Throughout the entire history of pneumatic tires, users have been plagued with the problems caused by loss of air, either through punctures or slow leaks. Such loss of air meant having to change the tire before the user could drive any further, as running on a flat tire would have caused severe damage to the tire. It could also have damaged the rim of the wheel and other parts of the running gear because the conventional pneumatic tire, when deflated and run in that condition tends to leave the rim and, if it remains on the rim, provides an inadequate cushion against shocks from the road.

A pneumatic tire has been developed which has the ability to be run in a totally deflated condition without damaging the rim or sustaining damage itself. While this tire represents a great advance over the prior art, its successful operation is largely dependent on its bead portions staying on the bead seats of the rim when it is run without any inflation.

A further problem of pneumatic tire-wheel assemblies is the occasional slippage of the tire circumferentially on the wheel under high torque conditions.

The principal object of this invention is, therefore, to provide a wheel and tire assembly such that the bead portions of the tire will remain affixed to the wheel and prevent displacement even when the tire is run without inflation.

SUMMARY OF THE INVENTION

The invention comprises an assembly of a vehicle wheel and a pneumatic tire, capable of running in deflated condition, the tire having its bead portions cemented onto the rim of the wheel with an adhesive. In general, the run-flat tire used is a tubeless radial tire, provided with an internal lubricant. The wheel can have any of the conventional rim configurations now in use with tubeless tires. The adhesive can be any known epoxy adhesive formulation preferably having some elasticity that will cure within a reasonable time after being applied. Preferably, the tire has a layer of cellular rubber inside the air impervious liner which is itself covered by a thin layer of a solid substance having a low coefficient of friction and which serves as a lubricant in the run-flat condition of the tire.

When the bead portions of the run-flat tire are cemented onto the rim of the wheel, the tire and wheel operate as an integral unit with no relative displacement between the parts. Moreover, the tire can then be run in a completely deflated condition for many miles without sustaining damage either to itself or the rim. The function of the cement is to keep the bead portions of the tire firmly attached to the bead seats of the rim during such operation. This function is critical, because if the bead portions of the tire separate from the rim, damage will most probably result to both elements.

THE DRAWINGS

In the accompanying drawings:

FIG. 1 is a cross section of one embodiment of the tire of this invention;

FIG. 2 is a fragmentary cross section on a larger scale to show more clearly the placement of the tire bead adhesive after it has been applied and the bead portion of the tire positioned on the bead seat of the rim; and, FIG. 3 is a fragmentary section of the tire and rim of FIG. 1 to show how the tire will collapse when it is mounted on a rim and is supporting the weight of a vehicle while the tire is in a deflated condition.

DETAILED DESCRIPTION

Figure 1:
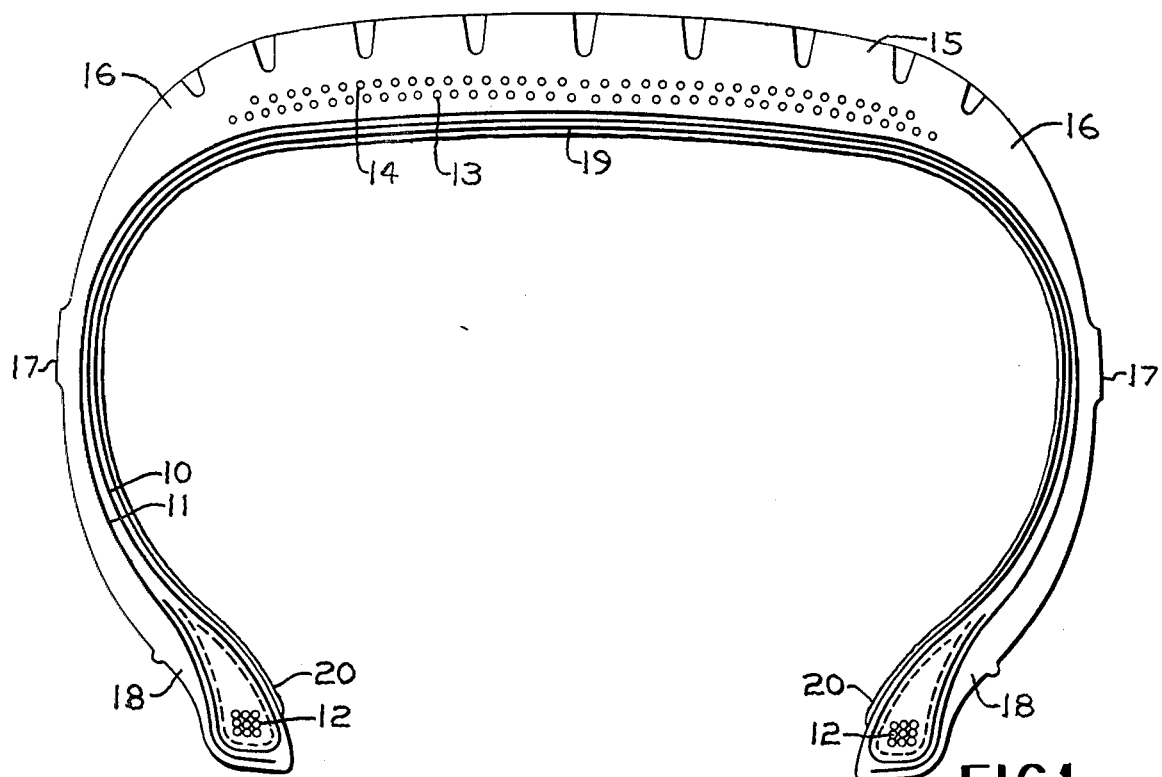
Figure 2:
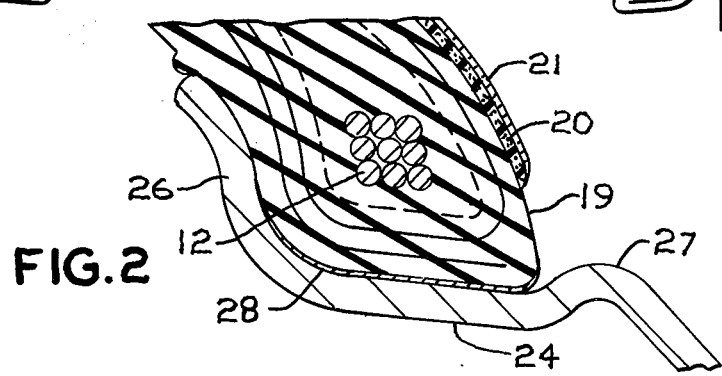

A presently preferred embodiment of this invention, as shown in FIG. 1 of the drawings, includes a radial cord passenger car tire having an aspect ratio of about 60, that is, the radial height of the inflated tire from the heel of the beads to the outer surface of the tread is about 60 percent of the maximum width from the surface of one sidewall to the other.

This particular tire is made with two plies of rubber covered radially extending cords of a nearly inextensible textile material, such as polyester cords. The innermost ply 10 is wide enough to be turned around the bead core for a substantial distance terminating on the outer surface of the bead portion. The second ply 11 laps the turnup of the first ply and extends under the base of the bead. The bead contains a wire grommet or core 12. Across the portion of the tire which is intended to engage the road, there is a belt of two plies of rubber covered steel cords 13 and 14 with the cords in each ply set at an angle of 20° to 30° and preferably about 25° to the circumferential midplane of the tire in the finished tire. The outermost ply 14 of steel cords is slightly narrower than the radially inward one. A tread 15 of abrasion-resistant rubber composition extends across the road-engaging surface outside of the belt plies of steel cords and is molded with a suitable non-skid pattern. The sidewalls are likewise covered with rubber of a suitable thickness for protecting the reinforcing cord plies.

In accordance with this invention, the tread 15 merges gradually at the shoulders 16 onto the sidewall rubber, and the portion of the sidewall rubber in the shoulder area is of nearly the same thickness as the tread rubber.

Radially inwardly from the shoulder 16, nearly as far toward the axis of the tire as the widest part of the reinforcing cord structures in its inflated condition, there may be a scuffing rib 17. However, if a scuffing rib is present, it is preferred that it be located in a particular zone of the tire sidewall. The zone in which the scuffing rib is to be located will depend on the proportions and cross-sectional contour of the tire.

Figure 3:
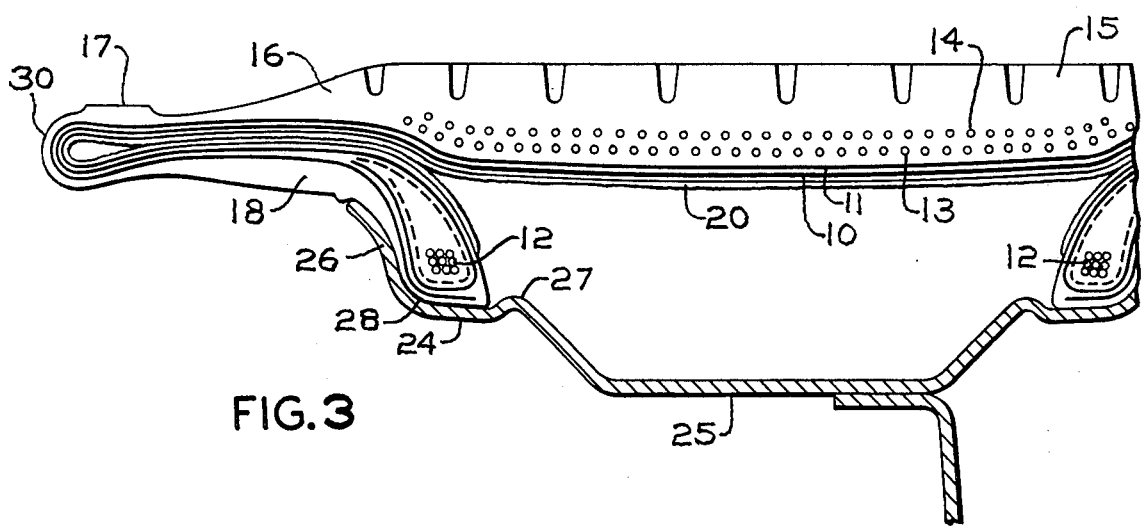

Pneumatic tires are always designed to seat on rims within a certain relatively narrow width range of rim from heel to heel of the bead seats. If the tire, or a section of such a tire is placed on a rim which it was designed to fit with the tire beads properly located on the bead seats, and if the tread is squeezed toward the rim until the tire is completely flattened with the inner surface of the tire near the shoulders engaging an inner surface near the tips of the rim flanges, a fairly sharp fold will appear in the sidewall, as indicated in FIG. 3. The location of such a fold should be determined and the scuffing rib 17, if any, should be located radially outward from the fold. Otherwise stated, the sidewall rubber on the outer surface of the tire should be of a minimum thickness at the location of the fold and should not include a scuffing rib or other thickened structure at that location.

The sidewall rubber in the direction toward the axis of the tire adjacent to the scuffing rib 17 is of smallest thickness and increases gradually in thickness toward the rim-engaging surfaces at the tire beads so that a substantial rim cushion 18 is present between the reinforcing cords and the margin of each of the rim flanges when the tire is mounted. The cushion is constructed so that the thickness is greatest in the location of the rim flange and decreases in the direction of the beads so that the cushion at the heel and under the base of the bead is of small thickness for firm engagement and sealing of the bead to the rim.

The tire which is being described is a tubeless tire and therefore contains an essentially air-impervious liner 19 consisting in large part of butyl rubber, chlorinated butyl, or other suitable elastomer resistant to diffusion of air.

Inside of the liner layer 19 is a cushioning layer of cellular rubber 20 of substantial thickness covering the entire inner surface from nearly the toe of one bead to nearly the toe of the opposite bead. The cellular rubber layer 20 must be of a material which adheres strongly to the next adjacent layer, which in this case, is the tire liner, and has a high strength and resilience so that it will not tear or chafe or crack when subjected to intense flexure, pressure an rubbing. It also must be capable of forming and containing bubbles of nitrogen or other suitable gas to enhance its cushioning ability. A presently preferred material for this purpose is butyl rubber either alone or blended with reclaimed butyl or chlorinated butyl, or either of the latter together with natural rubber or its true synthetic equivalent. However, other elastomers having essentially the same properties can be used instead, including vulcanizable ethylene-propylene rubbers and polyether rubbers.

Both the nature of this internal cushion of cellular rubber 20 and its thickness are of importance for proper performance of the tire in an uninflated condition. The thickness should be increased in approximate proportion to the maximum dimensions of the tire so that it will be substantially thicker for large sizes than for small ones and should also be increased in approximate proportion to load so that a thicker internal cushion will be present in tires of the same sizes but designed for carrying heavier loads.

For example, a tire of BR 60-13 size with Load Range B is designed for loads of about 890 lbs. (405 kg.) at 20 psi (1.3 Atm.) inflation pressure to a maximum of 1,150 lbs. (520 kg.) at 32 psi (2.1 Atm.).

In such a tire of the construction described above, a conventional liner 19 is used, of a thickness of about 0.08 in. (2 mm.), consisting primarily of diffusion resistant olefin polymer rubber, such as a blend of about 50 parts by weight of chlorinated butyl rubber, and 56 parts of reclaimed butyl rubber of about 50 percent rubber content with 22 parts of other hydrocarbon polymer rubbers, together with 50 parts of thermal carbon black, 16 parts of softening oil, 2 parts of tackifying resin, 0.5 parts of fatty acid, 5 parts of zinc oxide, 0.25 parts sulfur (either as free sulfur or the sulfur content of a sulfur donor), and vulcanization accelerators which will bring about vulcanization under the conditions stated below. This liner composition adheres firmly to the usual cord ply coating compositions, both during the tire building operation and after vulcanization.

The cellular rubber 20 is built into the tire to be the innermost layer, as a sheet of unvulcanized material of initially about the same thickness as the impervious liner. Thus, with a liner of the thickness stated above, the sheet of material which is to be expanded to become cellular rubber may have an original thickness, before expansion, either less or greater than the liner thickness, but preferably slightly greater, in the range of 0.10 to 0.12 in. (2.5 to 3 mm.) for satisfactory performance after loss of inflation air. The cellular rubber composition is made from generally the same constituents as the liner 19 with modifications to facilitate expansion to a well-vulcanized product of several times its original volume. Specifically, 32 parts by weight of polyisoprene, 42 parts of chlorinated butyl rubber, and 52 parts of reclaimed butyl rubber of about 50 percent rubber content are mixed, together with about 50 to 80 parts of mineral filler (depending on density), 17 parts of general purpose furnace black, 15 parts of softener oil, 2 parts of fatty acid, 5 parts of zinc oxide, 2 parts of tackifying resin, 0.22 parts sulfur (as free sulfur or in a sulfur donor), with vulcanization accelerators which will bring about vulcanization under the conditions stated below, and 6 parts of azobisformamide masterbatched with 2 parts of rubber.

The azobisformamide is a commercially available blowing agent which decomposes, releasing nitrogen gas, at temperatures in the range from about 320° to 390°F. (160° to 200°C.).

In the process of manufacturing the tire, the sheet of cellular rubber composition 20 (in its unexpanded condition) about 0.10 in. (2.5 mm.) thick, and of a width sufficient to extend completely across the inner surface of the tire to positions near the toe of the bead on either side, is placed centrally on the tire building drum and its ends are joined. The liner 19, in a wider width which will cover the entire inner surface of the tire from at least the heel of one bead to the heel of the other bead, is then placed over the cellular rubber layer 20, followed by the radial cord plies 10 and 11 and the usual bead subassembly including a wire grommet 12 on either side, with the margins of the cord plies wrapped around the beads in the usual way. From this stage on, the tire can be completed by any conventional procedure, depending on the choice of belt cord angles and on equipment available. For example, the one-stage process may be used in which the belt plies 13,14 are successively placed over the radial cord body, followed by abrasion-resistant rubber in thicknesses proper for forming the outer surfaces, including the tread 15, shoulders 16, scuffing rib 17, sidewall cover and rim cushion 18, with expansion of the green tire to the toroidal shape being effected in the vulcanizing press. Alternatively, the two-stage process may be used in which the belt plies 13,14 are separately assembled (either with or without the sidewall and tread rubber), and the radial cord body is expanded into the belt as a separate operation (immediately followed by application of sidewall and tread if not already present) before introduction in the vulcanizing press.

The compositions described above are designed for vulcanization in a press in which an internal bladder containing steam and/or hot water under pressure at about 338° to 405°F. (170° to 208°C.) forces the tire against a mold heated to about 338°F. (170°C.) for about 25 to 15 minutes. At conclusion of the vulcanization, the pressure is released by venting the steam or hot water from the bladder, whereupon the cellular rubber immediately expands to several times its original volume, by the formation therein of a multiplicity of gas-containing closed cells, and the completed tire is removed from the mold.

A low coefficient of friction is essential on the actual exposed inside surface of the tire so that the relative motion between the inside of the shoulder portion of the tire and the facing part of the bead area of the tire when run in its deflated collapsed condition will not create destructive forces resulting in tearing or chafing or heating of the surfaces. Such a low coefficient of friction may be provided after vulcanization has been completed by covering the exposed surface of the cellular rubber with a very thin film 21 of slippery material of low molecular weight.

It is preferred to give the tire an internal coating which may extend over the entire exposed surface of the cellular rubber but need only be in the crown of a solid, fluent polyethylene of melting point about 170°F. (77°C.), and weight average molecular weight about 1000 to 3000 and preferably about 2000. This material has the consistency of a stiff grease which will not liquify and flow to the bottom of the tire when warm, nor crack and peel when cold, but will flex with the tire under normal operating conditions. This can be brushed or spread on in a molten condition in a quantity to supply a uniform film thickness of not over about 0.02 in. (0.5 mm.) produced by a total weight of about 7 oz. (200 g.).

The wheel can be any of those which are normally used in the art. As a particular example, FIG. 3 shows a tire in a deflated condition mounted on a wheel having a rim with a "hump" type bead seat. The rim has side flanges 26. Side flanges 26 each slope radially downward to a bead seat 24. Each bead seat declines at an angle of approximately 5° relative to the axis of the wheel until it terminates at a safety hump 27 which is a small cylindrical surface interposed between the bead seat and the center well portion 25 of the rim.

In order to carry out the invention, the bead seats 24 and inside surfaces of flanges 26 are thoroughly cleaned and the tire is then mounted on the rim. Before the tire is inflated, the bead portions of the tire are pushed away from the flanges and an adhesive 28 is applied to each bead seat. The bead portions of the tire are then properly seated on the bead seats 24 and in engagement with the flanges 26 whereupon the tire is inflated. After the adhesive has cured, the tire is then ready to be mounted on the automobile.

In operation, the cellular layer 20 in the tire performs a dual function. In case of puncture by an object extending through the layer, the gas entrapped in the closed cells cause those cells adjacent the object to expand into the region vacated by the object as it is withdrawn sealing the resulting opening and preventing loss of the inflation air from the tire. However, if the tire goes flat because the puncture is not completely sealed, or for any other reason, the inflation air is lost from the tire, operation of the assembly on a vehicle can continue with the tire running in flat condition. Under this condition, the layer 20 and lubricant 21 prevent injury to the assembly while the retention of the tire on the rim is assured by the adhesive 28.

In a preferred embodiment of the invention, the adhesive is an epoxy sealant formulation made by mixing about 100 parts by weight of diglycidyl ether of p,p'-isopropylidene bisphenol (sold by the Shell Chemical Corp. under the trade name Epon 828) with approximately 10 parts per weight of triethylenetetraamine (TETA) per 100 parts by weight of Epon 828. This composition should be mixed immediately before it is applied to the bead seats and its cure rate is such that the tire should be ready to mount on the rim within an hour of its application. The cure rate can be varied according to how much TETA is used. Five parts by weight of TETA to 100 parts by weight of Epon 828 results in a much slower curing time while a ratio of 15 parts by weight of TETA to 100 parts by weight of Epon 828 is much quicker to dry.

In addition to the epoxy formulation described above, Epon 828 can be used with dibromo polybutadiene, which is sold generally under the name of Polysar RTV Rubber by the Polysar Corporation. Alternatively, Epon 828 can be used with a liquid polysulfide polymer of 4000 average molecular weight having a viscosity of 400 poise at 25°C., which is sold as Thiokol LP2 by the Thiokol Chemical Corp.

Although certain specific epoxy formulations have been given by way of example, the invention is not limited to use of any particular formulation, other than by the requirement that the formulation have good affinity for rubber and metal and not deteriorate in the presence of water. Also, while it is preferable that the tire of the invention have a cushion layer on the interior of the air impervious liner, the invention in its broadest aspects encompasses an assembly in which the tire does not have such a layer. Moreover, it is not essential that the rim have a circumferential rib or hump axially inward of each bead seat. These and other adaptations and modifications of the assembly, which will be readily apparent to those skilled in the art, are all encompassed within the ambit of the invention, the scope of which is defined in the attached claims.

I claim:

1. A combination comprising:
   a. a wheel having a tire-mounting rim with axially spaced bead seats;
   b. a pneumatic tire mounted on the rim having
      1. a carcass reinforced with radially extending cords, the carcass having
         i. two axially spaced bead portions in which the carcass terminates
         ii. two axially spaced sidewall portions, one adjacent to each bead portion, and
         iii. a crown portion intermediate the sidewall portions,
      2. a circumferentially extending restrictive belt radially outwardly of said carcass at the crown portion,
      3. a tread radially outwardly of said belt, and
      4. a layer of closed cell cellular elastomeric material
      5. a layer of substance on the radially inner side of said cellular elastomeric material said layer of substance having a coefficient of friction sufficient to prevent tearing, chafing or heating of the internal sidewall and bead portions of the tire when run in a completely deflated condition, in which the tire is flattened against the rim and portions of the internal surface of each sidewall are folded axially outwardly into contact under the weight resting on the tire and both said layers covering the entire inner surface of the bead portions, sidewall portions and crown portion;

c. an adhesive cementing the bead portions of said tire to the bead seats of said rim to prevent separation of the beads and rim when the tire is run in the completely deflated condition.

2. The combination as defined in claim 1 wherein the layer of closed cell, cellular elastomeric material is such that the tire is self sealing.

3. The combination as defined in claim 1 wherein said layer of substance is polyethylene.

4. A combination as defined in claim 1 wherein said adhesive is an epoxy formulation which comprises diglycidyl ether of p,p'isopropylidene bisphenol and a material selected from the group consisting of triethylene-tetraamine, dibromo-polybutadiene and a liquid polysulfide polymer of 4000 average molecular weight.

* * * * *